United States Patent [19]

Barrette et al.

[11] Patent Number: 4,862,926
[45] Date of Patent: Sep. 5, 1989

[54] SHAPED MONOFILAMENT COIL SEAM AND FABRICS

[75] Inventors: Denis Barrette, Valleyfield; Rajat Chakravarty; Andre' Loiselle, both of Quebec, all of Canada

[73] Assignee: Asten Group, Inc., Charleston, S.C.

[21] Appl. No.: 257,963

[22] Filed: Oct. 14, 1988

[51] Int. Cl.⁴ .............................. F16G 3/02; D21F 7/10
[52] U.S. Cl. ................................. 139/383 A; 24/33 P; 162/DIG. 1; 162/348
[58] Field of Search ....... 139/383 A, 383 AA, 425 A; 24/33 P, 33 C, 31 H; 162/DIG. 1, 348, 349, 199; 245/10

[56] References Cited

U.S. PATENT DOCUMENTS

| | | | |
|---|---|---|---|
| 3,815,645 | 6/1974 | Codorniu | 139/383 |
| 4,314,589 | 2/1982 | Buchanan et al. | 162/DIG. 1 |
| 4,438,788 | 3/1984 | Harwood | 139/383 |
| 4,567,077 | 1/1986 | Gauthier | 428/114 |
| 4,574,435 | 3/1986 | Luciano et al. | 24/33 |
| 4,654,122 | 3/1987 | Bachmann et al. | 162/348 |
| 4,658,863 | 4/1987 | Errecart | 139/383 A |
| 4,775,446 | 10/1988 | Eschmann | 139/383 A |

FOREIGN PATENT DOCUMENTS 1266891 3/1972 United Kingdom .

Primary Examiner—Andrew M. Falik
Attorney, Agent, or Firm—Volpe and Koenig

[57] ABSTRACT

A spiral seam construction for lower caliper, multi-layer papermaking fabrics. The spiral seam members have a plurality of headcurves which are interconnected by a plurality of winding legs. Each of the winding legs has a cross-section in which the vertical dimension is less than the horizontal dimension, whereby it is possible to use a larger seaming pintle without an associated increase in seam caliper. The winding legs determine the maximum caliper of the seam, and the seam does not exceed the final fabric caliper.

3 Claims, 2 Drawing Sheets

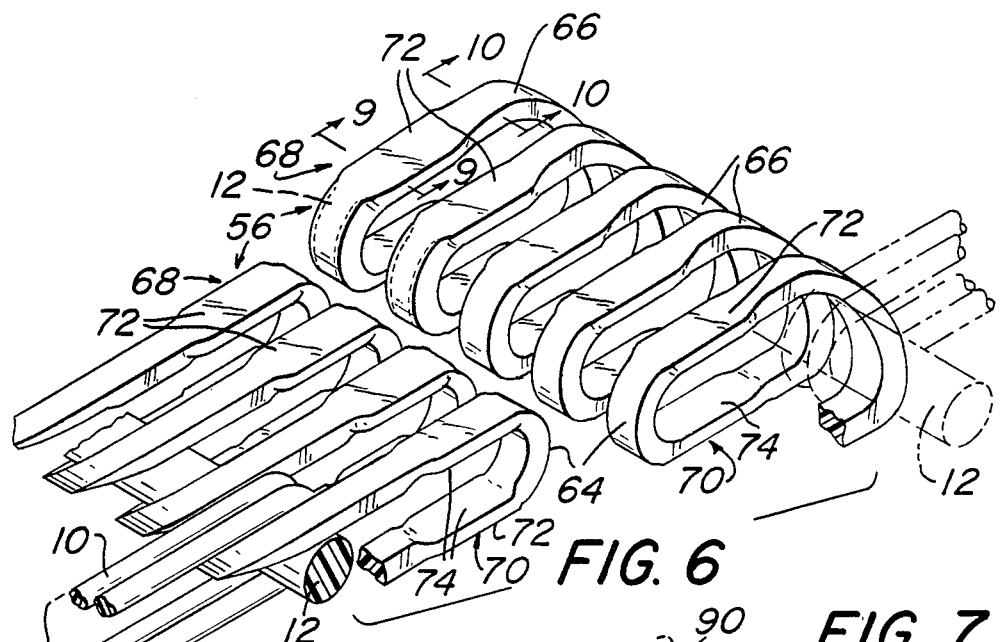
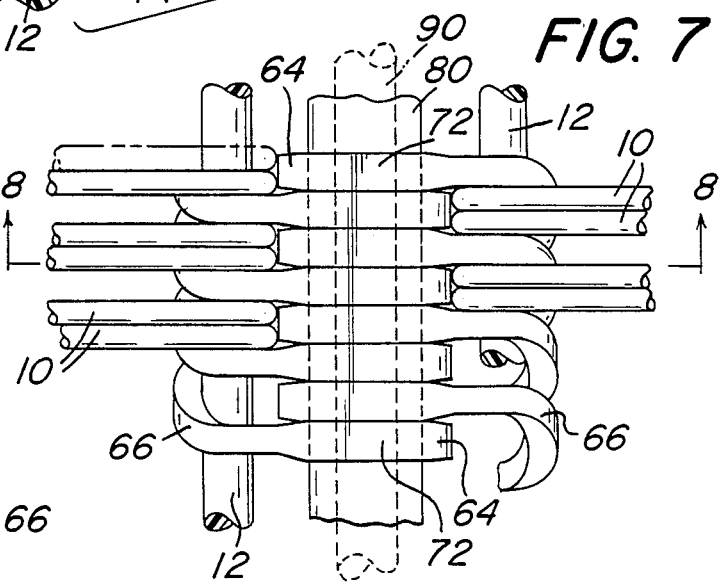
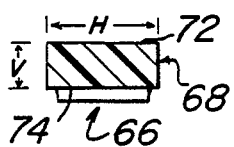
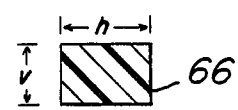
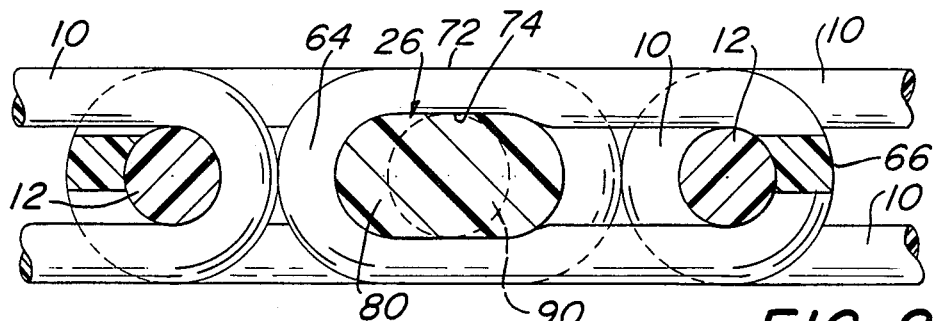

SHAPED MONOFILAMENT COIL SEAM AND FABRICS

BACKGROUND OF THE INVENTION

1. Field of the Invention

The present invention relates to a seam construction for a papermaker's fabric, in general and, in particular, to a seam construction for a papermaker's dryer fabric.

2. Prior Art

The prior art has recognized for some time the advantages to be achieved in seaming a woven papermaker's fabric to form an endless belt for use in paper machines. In the dryer section of the papermaking machines, it has long been accepted practice to seam the fabric.

Various seam constructions will be known to those skilled in the art. One type of known seam is the clipper hook seam. In this type of seam, the hooks, generally of stiff wire, are affixed to each end of the fabric and the ends of the fabric are meshed together and a cable inserted to complete the seam.

Another known seam is the multifilament seam. In this seam, multifilament yarn connecting loops are woven into a webbing that has been sewed to the fabric body.

Another known seam is the spiral seam. This seam is generally formed of all plastic materials. Loops of a continuous spiral are affixed to either end of the fabric, the loops are intermeshed and interconnected with a pintle wire to form the seam.

Another known seam is the pin seam. In this construction, connecting loops of machine direction monofilament yarns are woven back into the fabric body. Generally, the back woven yarns are woven to complement the weave pattern of the fabric body. The loops are intermeshed and joined as a seam by a monofilament connecting pin or pintle.

Regardless of the seam construction utilized, it has been recognized by the art that the seam characteristics are critical to the performance of the fabric as a papermaker's fabric. Likewise, it has been recognized that the seam must resemble the body of the fabric as closely as possible. In addition, the seam must be uniform and lie flat within the plane of the papermaker's fabric. Although certain applications may be more tolerant of seam irregularities, which may cause marks on the paper, it is always desirable to eliminate inconsistencies between the seam and the fabric body.

The seam construction in fabrics utilized in the dryer section of the fabric has long been recognized as being critical. However, as higher speeds are attained in the papermaking machine, the seam becomes increasingly critical in forming fabrics and wet press felts. In addition to increased speed, the desire to continuously reduce the caliper of the fabric, regardless of the section in which it is utilized, has lead to additional pressures for a uniform seam within the fabric plane.

In addition to the need for uniform seams in higher speed and lower caliper fabrics, it has long been recognized that the connecting pin or pintle utilized in the seam is critical to the operation of the seam and the durability of the fabric in production.

Although a number of the above seams have been successful, there are some remaining limitations in the prior art seam constructions. As the fabric thickness or caliper is reduced, the thickness of the seam must be reduced so that the seam does not have a greater thickness or caliper than the fabric. Such an enlarged seam can lead to paper marking and reduced seam life. The desire to reduce seam caliper has lead to an associated reduction in the size or caliper of the seaming elements. In particular, the pintle element has been reduced, in some cases, to the lower limits of acceptability. This has resulted in premature seam failure which renders an otherwise useful fabric unproductive.

In view of the above, it is the general object of the present invention to provide an improved seam construction that is especially useful for lower caliper papermaker's fabrics. In particular, it is an object of this invention to provide a seam construction for fabrics of the type having two layers of cross machine direction yarns interwoven with a common single layer of machine direction yarns.

SUMMARY OF THE INVENTION

The present invention provides an improved spiral seam construction which is especially useful for joining the ends of a papermaker's fabric comprised of interwoven machine and cross machine direction yarns. In some instances, the final papermaker's fabrics may include the woven fabric and an additional fabric layer or batt adhered thereto. In all instances, the maximum caliper of the seam will be limited by the caliper of the final papermaker's fabric being joined. In no instance, is the fabric seam permitted to extend beyond the planes defined by the upper paper carrying surface and the lower running surface of the fabric as installed on the papermaking equipment. The seam of the present invention is constructed by attaching spiral seaming elements to each end of the fabric. The spiral seaming elements are preferably attached by back weaving machine direction yarns in what is commonly referred to as a pin seam back weave construction.

The improved seam construction utilizes monofilament spiral seam members having a plurality of headcurves which are interconnected by a plurality of winding legs. The winding legs define the maximum caliper of the seam. The upper winding leg is a paper carrying or support winding leg and the lower winding leg is a machine contact or running winding leg. The winding legs do not extend beyond the plane defined by the upper and lower surfaces of the papermaker's fabric. The winding legs define the maximum caliper of the seam and that caliper does not exceed the final fabric caliper. Each of the winding legs has a cross sectional configuration having a vertical component that is less than the corresponding vertical component of the headcurve. This configuration makes it possible to use a larger seaming pintle without increasing the seam caliper.

BRIEF DESCRIPTION OF THE DRAWINGS

FIG. 6 illustrates a section of coil seam members fabricated from shaped monofilament yarn in accordance with the invention.

FIG. 7 shows the seam construction of FIG. 6 with the coil members intermeshed and the pintle in place. FIG. 7 also includes, in phantom, an alternative circular rather than shaped pintle.

FIG. 8 is a section through the line 8—8 of FIG. 7 and illustrates the relationship of the enlarged coil member to the seam construction.

FIG. 9 is a section through the line 9—9 of FIG. 6.

FIG. 10 is a section through the line 10—10

DETAILED DESCRIPTION OF THE INVENTION

Figure 1:
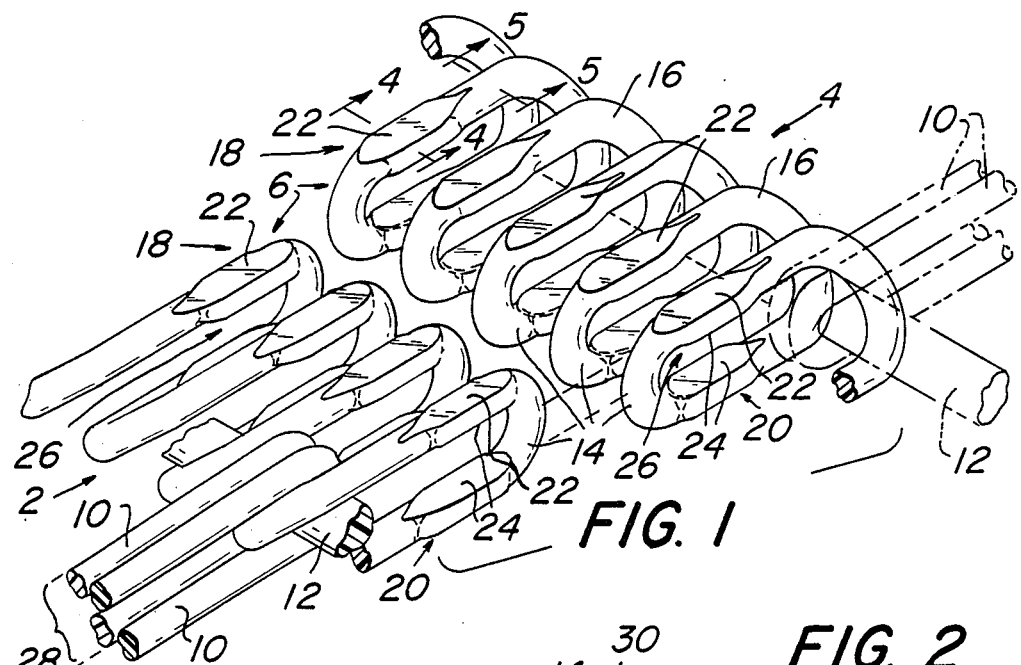
FIG. 1 illustrates a section of the coil members utilized in the seam construction according to the invention. The illustrated coil members are formed from a circular monofilament.

The invention will be described in detail with reference to the various drawing figures. For the purposes of clarity and ease of understanding, the actual fabric body has not been illustrated in the drawings. Likewise, the drawings omit some repeating details for the sake of clarity. Utilization of the present seam construction is not dependent upon the fabric construction or the paper machine position of end use. Accordingly, only so much of the fabric as is necessary to an understanding of the seam construction has been illustrated. One fabric structure suitable for use with the present invention is described in U.S. Pat. No. 4,286,631. Another suitable fabric structure suitable for use with the present invention is described in U.S. Pat. No. 4,401,137.

Referring to FIG. 1, there is illustrated a portion of the seam construction prior to closing of the seam. The fabric has two opposed ends, 2 and 4, each of which is provided with a coil member 6. In the illustration of FIG. 1, the coil members 6 are produced from continuous monofilament yarns. The yarns in this configuration have a circular cross section. Each coil member 6 has a plurality of angular headcurves 16 which are adjacent the fabric body, not illustrated, and a plurality of vertical headcurves 14 which extend towards the opposite end of the fabric. The vertical end curves 14 of each spiral member 6 are spaced by a sufficient distance to permit intermeshing with the opposite spiral member. This configuration will be known to those skilled in the art.

Each of the angular headcurves 16 is spaced apart by a distance which is sufficient to permit two machine direction yarns 10 to be received between adjacent headcurves. It will be understood by those skilled in the art that the angular headcurves are also angled in accordance with the space requirements between the adjacent vertical headcurves 14. Thus, the space between angular headcurves will have a minimum determined by the space requirements of the two machine direction loops 10 and a maximum determined by the space requirements of the vertical headcurves. On the upper or paper carrying surface of the seam, the angular headcurves and vertical headcurves are interconnected by upper or supporting winding legs 18 and lower or running winding legs 20.

The winding legs 18 and 20 are generally parallel to each other and within the same vertical plane as the respective vertical headcurve 14. In the preferred embodiment, both the upper and lower winding legs are provided with exterior flat surfaces 22 and interior flat surfaces 24. It is preferred that the winding legs have both interior and exterior flat surfaces, however, the exterior flat surfaces 12 are not essential to obtain some of the benefits of the present invention. This distinction will be discussed in more detail hereinafter.

As a result of the interior flat surfaces 24, the spiral members 6 will define an interior channel void 26 which has a greater distance between the interior flat surfaces 24 than would be available in a uniformly circular coil member without the flat surfaces z4. As a result of the flat surfaces 24, the pintle channel which is defined by intermeshing the coil member 6 has a greater vertical dimension than would be available in a coil of the same uniformly sized monofilament without the flattened surfaces 24. As noted previously, it is preferred that the coil members 6 have flattened support surfaces 22. Spiral coils having flattened support surfaces usable with the present invention are disclosed in U.S. Pat. Nos. 4,606,792 and 4,654,122.

With respect to formation of the flattened interior surfaces 24, one method of producing those flattened surfaces will now be described. It is well known to those skilled in the art that spiral coils may be formed by wrapping suitable synthetic monofilament materials about a mandrel. In order to produce the flattened surfaces 24, a mandrel is selected having a vertical dimension which corresponds to the required vertical dimension of the channel 26. The coil material is then wrapped about the mandrel under sufficient conditions of heat and pressure to cause of a softening and flow of the coil material in the area of the interior surfaces 24. As will be known to those skilled in the art, the degree of heat and temperature required to cause formation of the surfaces 24 will depend upon the material selected for spiral member 6. The interior and exterior radius of the vertical headcurve 14 is virtually unaltered by the modification of the surfaces 24. Likewise, the interior and exterior radii of the angular headcurves 16 are virtually unaltered.

With respect to attachment of the coil members to the fabric body, this attachment is accomplished in substantially the same manner as that utilized by the prior art to form a pin seam. However, there are some differences which will be explained at this time. In the conventional pin seam, one in four of the machine direction yarns is used to form the seaming loops. However, due to the utilization of the coil members 6, the present invention utilizes two in four of the machine direction yarns to bind the coil members 6 to the fabric body. In the present invention, the machine direction loops do not form the seaming loop, as in a common pin seam, rather they form the binding loops which secure the coil member to the fabric body. Thus, the seam construction is strengthened through the utilization of twice as many machine direction yarns. This doubling of machine direction yarns is accomplished without any sacrifice in the quality of the seam. The machine direction yarns 10 which are utilized to form the binding loops 10 for the coil members 6 are twinned or paired and are positioned between and over the angular headcurves Although it is possible to attach the coil member 6 to the fabric body solely through the use of loop yarns 10, it is preferred that a tying yarn or pintle 12 be inserted within and adjacent to the angular headcurves 16. Thus, with reference to FIG. 1 it can be seen that the loops 10 extend between the angular headcurves around the tying wire or pintle 12 and weave back into the body of the fabric in the usual manner of a pin seam. Through the utilization of this construction, it is possible to equalize the tension placed on the respective angular headcurves 16. Since the tying wire or pintle 12 is under the influence of all of the loops 10, unequal tensions at various points on the coil member 6 will be avoided. The attachment of the coil members and the weaving back into the fabric body of the machine direction yarns forming loops 10 may be accomplished with a shed forming machine which will be known to those skilled in the art.

Figure 2:
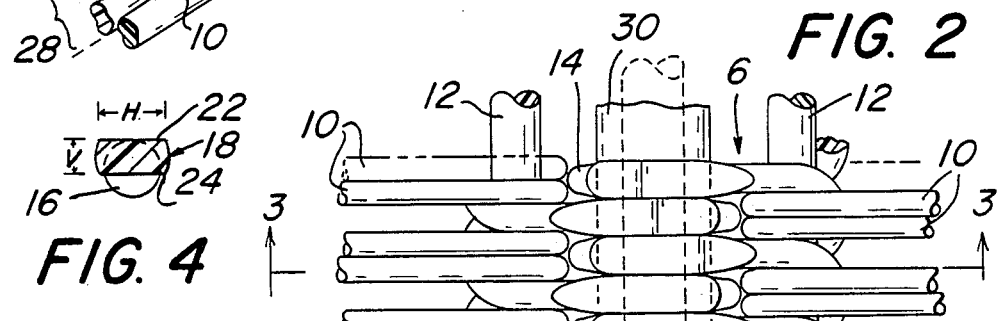
FIG. 2 illustrates a section of the seam construction with the coil members intermeshed and the pintle in place. This is illustrative of the final seam construction in the fabric on the papermaking machine. It also illustrates an alternative circular rather than shaped pintle.
Figure 3:
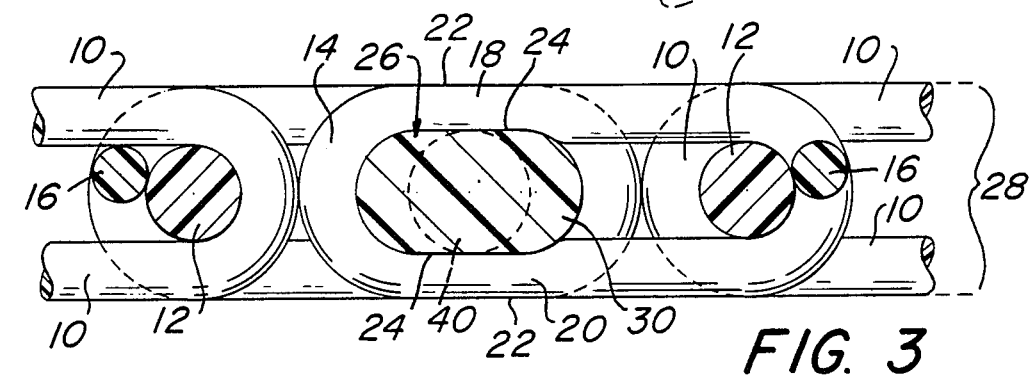
FIG. 3 is a section through the line 3—3 of FIG. 2 and illustrates the enlarged size of the pintle in the present seam construction.

Referring now to FIGS. 2 and 3, there is illustrated the assembly and closing of the seam of the present invention. As can be seen in FIG. 2, the coil members 6 are intermeshed to form a channel which receives the pintle 30. In the preferred embodiment, the pintle 30 has a non-circular configuration and is generally oval in configuration. Alternatively, the pintle may be round, rectangular, bone shaped or of other configurations. Some suitable configurations for the pintle are shown in U.S. Pat. No. 4,395,308.

In addition to the foregoing pintles, the present invention is particularly suitable for use with a fabric seam tightening pintle of the type disclosed in copending U.S. application Ser. No. 108,376, Pat. No. 4,806,208 which is assigned to the same assignee as the present invention.

With reference to FIG. 3, the advantages of the flattened interior surfaces 24 can be seen by comparing seaming pintle 30 with the tying wire or pintle 12 which generally illustrates the maximum pintle height possible without modification of the interior air space or channel 26. Absent the modification of the interior surface of the coil member 6, the vertical height of the seaming pintle 30 would be limited by the starting monofilament material in a manner similar to that illustrated for tying wire or pintle 12. The numeral 28 in FIG. 3 represents the caliper of the fabric. As this fabric caliper is reduced in an unmodified coil, the interior channel void 26 which accommodates the pintle 30 is likewise reduced. Accordingly, the vertical dimension of the pintle 30 is reduced and the strength of the seam is likewise reduced. With the present invention, reductions in the fabric caliper 28 do not necessitate further equivalent reductions in the pintle 30.

Still with reference to FIG. 3, it can be seen that the flattened exterior surfaces 22 are maintained within the caliper of the seam. By so maintaining the flattened surfaces 22, it is possible to provide a seamed fabric which is essentially planar throughout its length without any differential in the seam area. With reference to FIG. 2, it will be understood that the degree of flattening accomplished on the surface 22 will be related to the surface characteristics of the host fabric. As the fabric becomes courser or more open, the degree of flattening may be reduced so that the upper surface of the coil member 6 more nearly approaches the geometry of the headcurve portions. Likewise, insertion of a circular pintle or an oval pintle with a reduced horizontal component will permit the seam to open to a greater degree and thereby alter the permeability and surface characteristics of the seam.

Figure 4:
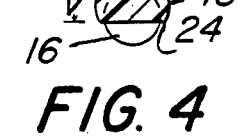
FIG. 4 is a section through the line 4—4 of FIG. 1 and illustrates the respective geometry of the winding legs versus the headcurves.
Figure 5:
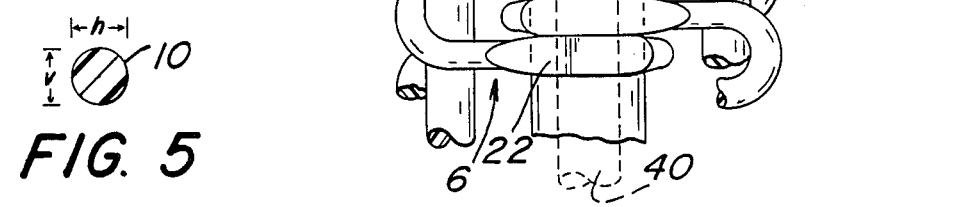
FIG. 5 is a section through the line 5—5 of FIG. 1 and may be compared with FIG. 4 as a further illustration of the configuration of the coil member in the present seam construction.

With reference to FIGS. 4 and 5, it can be seen that the exterior flat surface 22 is in substantially the same plane as the upper most portion of the angular headcurve 16 and that the interior flat surface 24 is recessed from the lower plane defined by the bottom of the angular headcurve 16. Thus, the coil member 6 in the area of the winding leg IB will have a vertical dimension V less than the corresponding vertical dimension v of the angular headcurve 16 and a horizontal dimension H greater than the corresponding horizontal dimension h of the angular headcurve 16.

With respect to the lower winding leg 20, it is expected that certain applications will call for additional material on the lower winding leg, due to abrasion or wear characteristics of the papermaking equipment. Accordingly, it is contemplated that in certain embodiments the lower winding leg may not incorporate the exterior flat surface 22. However, in all embodiments, it is contemplated that the interior flat surfaces 24 will be formed on winding legs 18 and 20. At this time, it is believed that the use of interior flattened surfaces 24 on both winding legs 18 and 20 will assure alignment of the pintle during operation of the fabric.

With respect to the upper winding leg 18, it is expected that certain applications will call for paper support characteristics that are better met by elimination of exterior flat surfaces 22. Accordingly, it is contemplated that, in certain applications, the surface characteristics, air and water permeability and fabric body weave pattern will result in elimination of the exterior flat surface 22. Once again, it is contemplated that such an embodiment would continue to incorporate interior flat surfaces 24 on winding legs 18 and 20.

With reference to FIGS. 6 through 10, there is illustrated an embodiment of the present invention which utilizes shaped or flat monofilament coil material. The coil members 56 may be prepared as previously described. The attachment of the coil members 56 to the body of the fabric will be as previously described. Once again, the use of a tying yarn or pintle 12 in connection with the loops 10 is preferred.

Each of the coil members 56 will be comprised of a series of angular headcurves 66 and vertical headcurves 64 which are interconnected by winding legs 68 and 70. Once again, it is preferred that the coil members 56 have exterior flattened surfaces 72 and interior flattened surfaces 74 are within the caliper 78 of the fabric.

In the embodiment depicted in FIG. 6, the increase in the horizontal dimension of the winding legs 68 and 70 relative to the headcurves will be less than that exhibited with round monofilament. As will be understood by those skilled in the art, the preshaped nature of the starting monofilament coil material means that there is less material available for reshaping or relocation. Notwithstanding this limitation, the advantage of increased pintle size may still be obtained with shaped monofilament.

In those coils which have been produced to date, it has been found that the vertical headcurve 64 will undergo a slight horizontal expansion which results in the headcurve 64 having a slightly larger horizontal component than the angular headcurve 66. However, the horizontal component of the vertical headcurve 64 has been found to be slightly less than that of the winding legs 68 and 70. With reference to FIG. 6, the phantom lines 82 indicate a vertical headcurve which has maintained the same horizontal dimension as the angular headcurve 66.

With reference to FIG. 7, it can be seen that the principle configuration of FIG. 6 would produce a slight variation in the seam, adjacent the fabric body across the width of the seam after installation of the pintle 80. In the vast majority of applications, such a minor discrepancy in the seam would not be of any consequence. However, in certain fine dryer applications, it is desirable to eliminate all possible variations between and among the seam and the fabric and the seam construction itself. Accordingly, in sensitive applications, it is fully contemplated that the vertical headcurves 64 and the angular headcurves 66 could be maintained with virtually identical configurations.

With reference to FIGS. 2, 3, 7 and s, there is also shown, in phantom, a circular pintle 40 and 90 respectively. In those applications where it is desired to increase the porosity or open area in the seam, a circular pintle may be utilized as a means of accomplishing this end. Utilization of a circular pintle will result in a more open seam configuration, but will still benefit from the increased pintle size.

In addition to the above described coil members, it is contemplated by a further alternative embodiment that the coil members 6 may have a uniform geometry throughout the headcurve and winding legs. This alternative embodiment will find use in those higher caliper fabrics where further modification of the winding legs is not necessary to achieve caliper height but it is desirable to include an enlarged pintle in the seam construction. In this construction, each of the coil members 6 would be comprised of a single monofilament having a flattened or generally rectangular configuration. Thus, the entire monofilament would have a cross sectional geometry which corresponds to that illustrated in FIG. 10 for the headcurve 66. In this embodiment, the shaped monofilament is utilized instead of the circular monofilament. As can be seen with reference to FIG. 10, the resulting coil member will define a pintle receiving channel having a larger cross sectional area than could be accomplished with a coil member having a circular yarn of equal denier within the same maximum caliper.

In addition to the use of circular pintles and other geometric configurations, it is contemplated that the pintles may utilize configurations of the type disclosed as stuffers in U.S. Pat. No. 4,567,077 as a means for further controlling characteristics such as air and moisture permeability.

With respect to the selection of materials for formation of the coil members 6 and the pintle member 30, 80 or 90, it is expected that typical fabric materials such as polyester, polyamide, polyolefin, polyaryletherketone, polyetheretherketone, Ryton® and the like may be utilized as starting materials. Likewise, it is contemplated that the coil member 6 in certain embodiments, may have flocking or fiber segments adhered thereto, such as disclosed in U.S. Pat. No. 4,654,122.

It will be understood by those skilled in the art that the present invention provides a seam construction with increased strength in the seam area in general and in the pintle area in particular. Furthermore, it will be recognized that the present seam incorporates the advantages of both prior art pin and coil seams.

We claim:

1. An improved spiral seam construction joining the ends of a papermaker's fabric having a predetermined caliper, said fabric having interwoven machine direction and cross machine direction yarns which define a fabric body between the ends thereof and selected machine direction yarns at each end which define a series of loops that extend from the fabric body and secure a spiral seam member to each end thereof such that the spiral seam members intermesh and define a pintle channel into which a pintle is inserted to close the fabric seam and form an endless papermaker's fabric, the improvement comprising:

monofilament spiral seam members having a plurality of headcurves which are interconnected by a plurality of winding legs which define a maximum caliper of the seam, said maximum caliper being no greater than the predetermined caliper of the papermaker's fabric, each of said winding legs having a cross section with a vertical dimension which is less than the corresponding vertical dimension of the interconnected headcurve cross section, and the pintle channel defined by intermeshing the spiral seam members has a vertical dimension which is increased in direct proportion to the difference between the vertical dimensions of the winding legs and the headcurves.

2. An improved spiral seam construction joining the ends of a papermaker's fabric having a predetermined caliper, said fabric having interwoven machine direction and cross machine direction yarns which define a fabric body between the ends thereof and a spiral seam member secured to each end thereof such that the spiral seam members intermesh and define a pintle channel into which a pintle is inserted to close the fabric seam and form an endless papermaker's fabric, the improvement comprising:

monofilament spiral seam members having a plurality of headcurves which are interconnected by a plurality of winding legs which define a maximum caliper of the seam, said maximum caliper being no greater than the predetermined caliper of the papermaker's fabric, selected ones of said winding legs having a cross section with a vertical dimension which is less than the corresponding cross section vertical dimension of the respective headcurve, and the pintle channel defined by intermeshing the spiral seam members has a vertical dimension which is increased by the difference between the vertical dimensions of the respective winding legs and headcurves.

3. An improved spiral seam construction joining the ends of a papermaker's fabric having a predetermined caliper, said fabric having interwoven machine direction and cross machine direction yarns which define a fabric body between the ends thereof and selected machine direction yarns at each end which define a series of loops that extend from the fabric body and secure a spiral seam member to each end thereof such that the spiral seam members intermesh and define a pintle channel into which a pintle is inserted to close the fabric seam and form an endless papermaker's fabric, the improvement comprising:

monofilament spiral seam members having a plurality of headcurves which are interconnected by a plurality of winding legs which define a maximum caliper of the seam, said maximum caliper being no greater than the predetermined caliper of the papermaker's fabric, each of said monofilament spiral seam members having a substantially uniform cross section throughout, said cross section having a vertical dimension which is less than its horizontal dimension, and the pintle channel defined by intermeshing the spiral seam members has a vertical dimension which is greater than that which can be achieved within the same maximum caliper with spiral seam members having circular yarns.

* * * * *

UNITED STATES PATENT AND TRADEMARK OFFICE
CERTIFICATE OF CORRECTION

PATENT NO. : 4,862,926

DATED : September 5, 1989

INVENTOR(S) : Denis Barrette, et al

It is certified that error appears in the above-identified patent and that said Letters Patent is hereby corrected as shown below:

At column 2, line 61, delete "illustrate s" and insert therefor --illustrates--.

At column 3, line 19, after 10-10 insert --of Figure 6.--.

At column 3, line 54, delete "y arns" and insert therefor --yarns--.

At column 3, line 65, delete the word "Or" second occurrence, and insert therefor --or--.

At column 4, line 6, delete reference numeral "12" and insert therefor --22--.

At column 4, line 13, delete "z4" and insert therefor --24--.

At column 4, line 63, after the word "headcurves" insert --16.--.

UNITED STATES PATENT AND TRADEMARK OFFICE
CERTIFICATE OF CORRECTION

PATENT NO. : 4,862,926

DATED : September 5, 1989

INVENTOR(S) : Denis Barrette, et al

It is certified that error appears in the above-identified patent and that said Letters Patent is hereby corrected as shown below:

At column 6, line 2, delete "IB" and insert therefor --18--.

At column 7, line 9, delete the "s" and insert therefor --8--.

Signed and Sealed this

Seventeenth Day of July, 1990

Attest:

HARRY F. MANBECK, JR.

*Attesting Officer*      *Commissioner of Patents and Trademarks*